(No Model.)  2 Sheets—Sheet 1.

T. AHEARN.
FIRE ALARM TELEGRAPH.

No. 283,944.  Patented Aug. 28, 1883.

WITNESSES.
Jas. F. DuHamel
Walter S. Dodge

INVENTOR:
Thomas Ahearn,
by Dodge Son,
Attys.

(No Model.)
2 Sheets—Sheet 2.
T. AHEARN.
FIRE ALARM TELEGRAPH.
No. 283,944.   Patented Aug. 28, 1883.
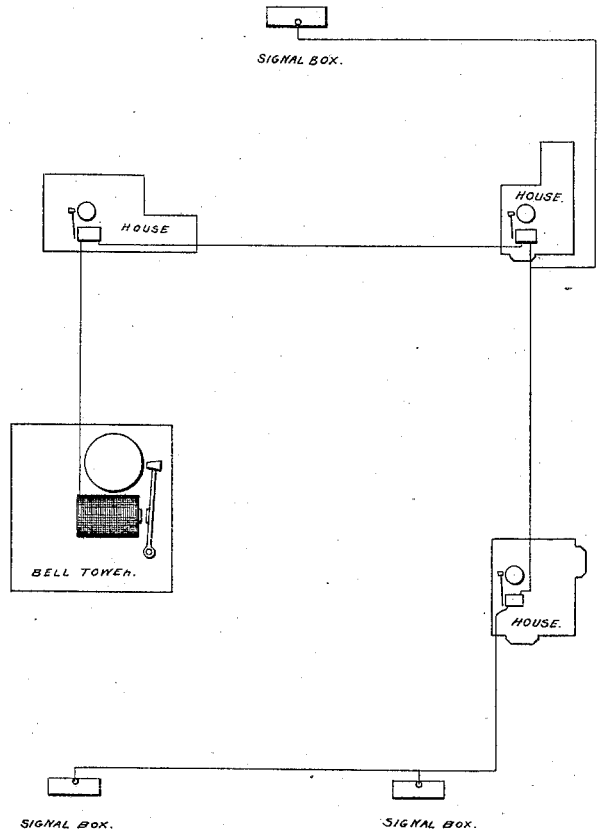
WITNESSES:
INVENTOR:

UNITED STATES PATENT OFFICE.

THOMAS AHEARN, OF OTTAWA, ONTARIO, CANADA.

FIRE-ALARM TELEGRAPH.

SPECIFICATION forming part of Letters Patent No. 283,944, dated August 28, 1883.

Application filed May 9, 1883. (No model.)

*To all whom it may concern:*

Be it known that I, THOMAS AHEARN, of Ottawa, in the county of Carleton and Dominion of Canada, have invented certain Improvements in Fire - Alarm Telegraphs, of which the following is a specification.

This invention relates to an improved district fire-alarm system, designed more especially for small towns or communities where the expense of maintaining and keeping in order the ordinary battery system and the employment of skilled supervision is too great to permit the use thereof; and the invention consists in providing at the different alarm-stations a signal-wheel and a magneto or dynamo electric generator so combined and arranged that the signal-wheel shall rotate as the generator operates, thereby sending a signal over the line or lines to the different members or stations of a volunteer or paid brigade; or, also, when desired, to tower-bells or other places, indicating the point from which the alarm is sent by striking the number.

The invention further consists in certain details of mechanism hereinafter fully set forth. The generators above mentioned may be arranged to produce continuous or alternating currents of electricity.

Figure 1:
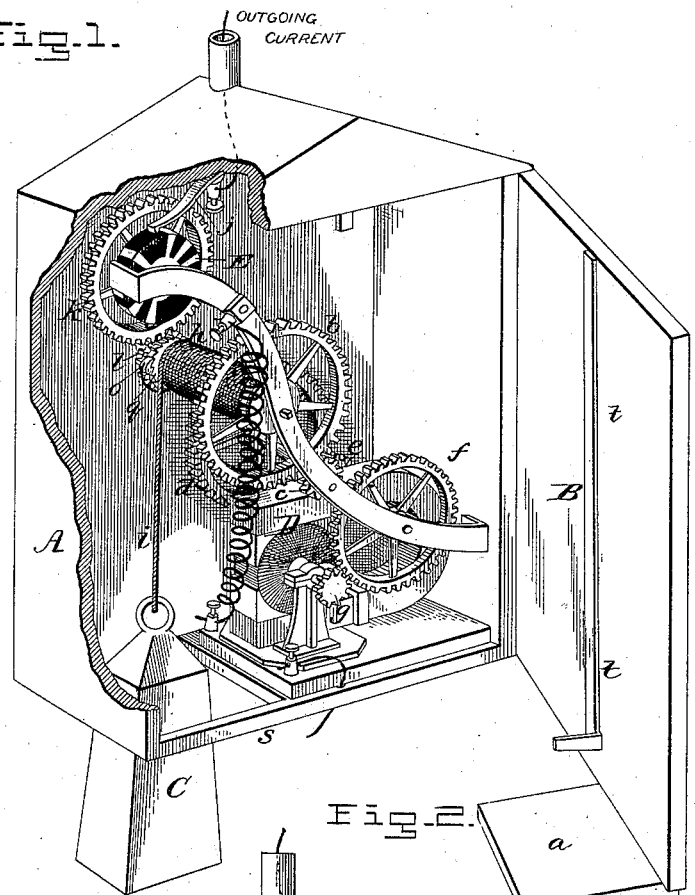
Figure 2:
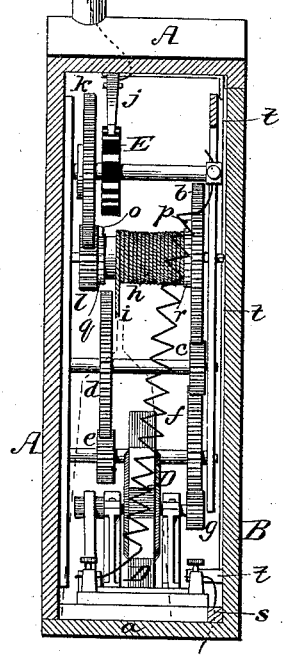

In the accompanying drawings, Figure 1 represents a perspective view of an alarm-box embodying my improvements; Fig. 2, a vertical section through the same, and Fig. 3 a view illustrating a system or series of alarm-boxes as applied in actual use.

The cost and attention necessary to the maintaining of the common fire-alarm telegraph systems are known to be very great, besides requiring a large outlay in the first instance, and these causes have to a great extent precluded the introduction of such system into small towns or communities. It therefore becomes desirable to provide a system which shall not become unduly expensive in the first instance, and which shall require little or no subsequent outlay or attention to maintain it in its working order. Such a system I have devised, and will now explain, referring again to the drawings, in which—

A represents an alarm-signal box of ordinary pattern, the door B of which is, however, formed with an inwardly-projecting ledge or shelf, $a$, as shown in Figs. 1 and 2, extending from the front to the rear of the box, for the purpose of supporting a weight, C, by which weight motion is given, through intermediate gearing, $b\ c\ d\ e\ f\ g$, to a small dynamo-electric or magneto - electric generator, D, arranged within the box. The gear-train will of course be extended or reduced, as desired, to multiply or reduce the revolutions of the generator-armature relatively to those of the drum $h$, on which the weight-cord $i$ is wound; or, instead of toothed gearing, pulleys and belt-connections may be employed.

E indicates a signal-wheel of usual construction, having raised portions arranged to make contact with a spring contact-finger, $j$, and intermediate depressions or insulated portions to break the circuit, as is well understood by all conversant with electrical matters. The signal-wheel is furnished with a gear-wheel, $k$, which meshes with a pinion, $l$, on the drum $h$, and consequently is slowly turned as the weight descends. In this way the weight is caused to impart to the signal-wheel a comparatively slow rotation, suitable for sounding an alarm, and to the generator-armature a rapid rotation, such as is required to produce a proper current of electricity. The wire or conductor enters the signal or alarm box, and is connected with the generator, and through it to the signal-wheel. The finger $j$ is connected with the outgoing wire. The system is preferably worked upon what is known as the "metallic circuit." The gear-wheel $b$ and pinion $l$ are preferably loosely journaled upon the shaft of drum $h$, and furnished, respectively, with clicks or pawls $o$ and $p$, to engage with ratchets $q$ and $r$ on said drum, so that the drum may turn in one direction without turning said wheel and pinion, the drum-shaft or arbor being squared to receive or furnished with a crank or handle, by which it may be turned to wind up the weight-cord. By this construction the weight may be raised without turning the signal-wheel. When the weight is raised and the door B closed, the shelf or extension $a$ passes beneath the weight and supports the same, as indicated in Fig. 2, and thereby holds the apparatus out of action; but upon opening the door the shelf or extension $a$ draws away from under the weight, permitting the latter to descend and operate the mechanism above explained. A strip or crosspiece, s, prevents the weight from being drawn outward by the shelf or extension a.

From the foregoing it will be seen that after the weight is raised and the door closed the apparatus will remain at rest, but ready for immediate operation, until the door of the box is opened, whereupon the weight will be released and the alarm sounded or transmitted to the various points desired, being repeated a greater or less number of times, according to the length of the weight-cord employed and the proportions established between the diameters of the drum and the gearing connecting the same with the signal-wheel.

I am aware that in telephone systems a call bell or signal is rung by means of a magneto-electric generator placed in the subscriber's box and operated manually, but not employing a signal-wheel for giving the location of the box. The alarm having been sent, the weight is again raised and the door closed to retain it in its elevated position, as well as to protect the mechanism, and the apparatus is again ready for instant use without any act of the person sending the alarm beyond merely opening the door of the box. The door will be furnished with a lock and key, as usual, to prevent miscreants from operating the device or sounding false alarms. The door cannot be closed until the weight has been wound up, thus insuring the box being always set for an alarm.

A crank may be used in lieu of weight C to operate the generator signal-wheel.

The generator and signal-wheel may be disconnected and independently operated as to their rotary motions, the electric connection being of course maintained; but the arrangement shown and described is greatly preferred. The closing of the box cuts out the internal mechanism by bringing the conducting-strip t into electrical contact with the two binding-posts, as indicated.

In Fig. 3 I have represented by diagram a convenient and advantageous arrangement of the apparatus for a town or district, the line-wire being carried through the houses of firemen or persons whose services are particularly relied upon in case of fire, and a bell being placed in each of said houses to alarm such persons and notify them to assemble at the engine-house or other proper place, or the bells being arranged to sound a definite alarm, and thus to inform them as to the location of the fire. All the signal-boxes being on the same line, the operation of any one will sound an alarm in each of the houses, as well as causing a proper alarm to be sounded on a bell in a bell-tower or other place. Mechanism of the character referred to being common, no description is necessary here.

Having thus described my invention, what I claim is—

1. A fire-alarm signal-box provided with a dynamo or magneto electric generator, a weight or equivalent means for operating said generator, and means, substantially such as shown and described, for locking said operating means out of action when the signal-box is closed.

2. A fire-alarm signal-box provided with a signal-wheel or its equivalent, a magneto-electric generator, and means for operating said signal-wheel and generator, adapted to be wound or set for action without operating said parts, to be held out of action until a detent is withdrawn, and then to automatically operate the generator and signal-wheel, all substantially as explained.

3. In a signal apparatus, the combination of signal-wheel E, finger j, connected with the line or conductor, generator D, drum h, connected with the signal-wheel and generator, substantially as shown and described, and weight C, for imparting motion to the drum, whereby the falling of the weight is caused to actuate the generator and the signal-wheel.

4. The herein-described signal apparatus, consisting of box A, door B, having ledge or shelf a, generator D, signal-wheel E, drum h, connected by gearing with the generator and the signal-wheel, and the weight C, suspended by a cord or band from drum h, all substantially as shown and described.

5. In combination with signal-wheel E and generator D, drum h, provided with ratchets q r and gear-wheel b, and pinion l, provided with pawls o and p, said gear and pinion being arranged, as described, to impart motion to the generator and signal-wheel, respectively, whereby the drum may be rotated in one direction independently of the other parts of the apparatus, for the purpose explained.

6. The combination, substantially as shown and described, of box A, provided with door B and strip t, weight C, generator D, signal-wheel E and intermediate gearing, finger j, and binding-posts, connected with opposite branches of the line, all substantially as and for the purpose set forth.

THOMAS AHEARN.

Witnesses:
H. O. E. PRATT,
N. C. PERKINS.